(12) United States Patent
Truong et al.

(10) Patent No.: US 10,433,011 B2
(45) Date of Patent: *Oct. 1, 2019

(54) APPARATUS AND METHOD FOR PROVIDING PROGRAMMING INFORMATION FOR MEDIA CONTENT TO A WEARABLE DEVICE

(71) Applicant: The DIRECTV Group, Inc., El Segundo, CA (US)

(72) Inventors: Heather Truong, Anaheim, CA (US); Binny Asarikuniyil, Cerritos, CA (US); Sudheer Bandela, Torrance, CA (US); Hai Nguyen, Torrance, CA (US)

(73) Assignee: The DIRECTIV Group, Inc., El Segundo, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/879,147

(22) Filed: Jan. 24, 2018

(65) Prior Publication Data

US 2018/0152761 A1 May 31, 2018

Related U.S. Application Data

(63) Continuation of application No. 15/221,014, filed on Jul. 27, 2016, now Pat. No. 9,918,129.

(51) Int. Cl.
*H04H 60/56* (2008.01)
*H04N 21/45* (2011.01)
(Continued)

(52) U.S. Cl.
CPC ..... *H04N 21/4532* (2013.01); *H04N 21/4126* (2013.01); *H04N 21/4147* (2013.01);
(Continued)

(58) Field of Classification Search
CPC .......... H04N 21/4532; H04N 21/4126; H04N 21/44218; H04N 21/4334; H04N 21/4335;
(Continued)

(56) References Cited

U.S. PATENT DOCUMENTS

| 7,107,608 | B2 | 9/2006 | Wagner et al. |
| 7,206,497 | B1 | 4/2007 | Boyle et al. |

(Continued)

FOREIGN PATENT DOCUMENTS

| DE | 19740079 A1 | 3/1999 |
| JP | 8275077 A | 3/1995 |
| JP | 2008060960 A | 3/2008 |

OTHER PUBLICATIONS

Integrated Remote Commander: Operating Instructions. RM-AV3000. Sony Corporation. 2002., pp. 1-104.
(Continued)

*Primary Examiner* — Michael B. Pierorazio
(74) *Attorney, Agent, or Firm* — Guntin & Gust, PLC; Atanu Das

(57) ABSTRACT

Aspects of the subject disclosure may include, for example, detecting a first wearable device and a second wearable device in proximity of a display device and identifying a first user profile associated with the first wearable device and a second user profile associated with the second wearable device. Further aspects may include identifying a first set of media content preferences according to the first user profile and a second set of media content preferences according to the second user profile. Additional aspects may include providing a first filtered electronic programming guide to the first wearable device and providing a second filtered electronic programming guide to the second wearable device. The first filtered electronic programming guide indicates the first set of media content preferences and the second filtered
(Continued)

electronic programming guide indicates the second set of media content preferences. Other embodiments are disclosed.

20 Claims, 7 Drawing Sheets

(51) Int. Cl.
H04N 21/41 (2011.01)
H04N 21/442 (2011.01)
H04N 21/433 (2011.01)
H04N 21/482 (2011.01)
H04N 21/4147 (2011.01)
H04N 21/454 (2011.01)
H04N 21/4335 (2011.01)

(52) U.S. Cl.
CPC ..... *H04N 21/4334* (2013.01); *H04N 21/4335* (2013.01); *H04N 21/44218* (2013.01); *H04N 21/454* (2013.01); *H04N 21/4524* (2013.01); *H04N 21/4821* (2013.01)

(58) Field of Classification Search
CPC ............. H04N 21/4147; H04N 21/454; H04N 21/4524; H04N 21/4821
USPC .......................................................... 725/12
See application file for complete search history.

(56) References Cited

U.S. PATENT DOCUMENTS

| | | | |
|---|---|---|---|
| 7,644,427 | B1 | 1/2010 | Horvitz et al. |
| 8,453,185 | B2 | 5/2013 | Bonfrer et al. |
| 8,578,423 | B2 | 11/2013 | Ellis et al. |
| 8,719,921 | B2 | 5/2014 | Johansson et al. |
| 8,768,309 | B2 | 7/2014 | Robbins et al. |
| 8,775,656 | B2 | 7/2014 | Panchangam et al. |
| 8,856,855 | B2 | 10/2014 | Lafreniere et al. |
| 8,893,164 | B1 | 11/2014 | Teller |
| 8,943,537 | B2 | 1/2015 | Wong et al. |
| 8,949,871 | B2 | 2/2015 | Chai et al. |
| 9,075,861 | B2 | 7/2015 | Aravamudan |
| 9,167,206 | B2 | 10/2015 | Goergen |
| 9,201,627 | B2 | 12/2015 | Tam |
| 9,264,771 | B1 | 2/2016 | Oztaskent |
| 9,344,436 | B1 | 5/2016 | Sheng |
| 2002/0085843 | A1 | 7/2002 | Mann et al. |
| 2003/0005454 | A1 | 1/2003 | Rodriguez et al. |
| 2003/0237093 | A1 | 12/2003 | Marsh et al. |
| 2006/0256133 | A1 | 11/2006 | Rosenberg et al. |
| 2007/0157247 | A1 | 7/2007 | Cordray et al. |
| 2009/0133051 | A1 | 5/2009 | Hildreth |
| 2009/0138805 | A1 | 5/2009 | Hildreth et al. |
| 2010/0058400 | A1 | 3/2010 | Nicas et al. |
| 2010/0118193 | A1 | 5/2010 | Boyden et al. |
| 2010/0141578 | A1 | 6/2010 | Horiuchi et al. |
| 2011/0138416 | A1 | 6/2011 | Kang et al. |
| 2012/0069131 | A1 | 3/2012 | Abelow |
| 2012/0075168 | A1 | 3/2012 | Osterhout et al. |
| 2012/0117103 | A1 | 5/2012 | Farrelly et al. |
| 2012/0192234 | A1 | 7/2012 | Britt et al. |
| 2012/0324550 | A1 | 12/2012 | Wasilewski et al. |
| 2013/0014136 | A1 | 1/2013 | Bhatia et al. |
| 2013/0074127 | A1 | 3/2013 | Kotecha et al. |
| 2013/0097638 | A1 | 4/2013 | Tanner et al. |
| 2014/0359647 | A1 | 12/2014 | Shoemake |
| 2015/0026708 | A1 | 1/2015 | Ahmed et al. |
| 2015/0100983 | A1 | 4/2015 | Pan |
| 2015/0106851 | A1 | 4/2015 | Paul |
| 2015/0264431 | A1 | 9/2015 | Cheng |
| 2015/0309687 | A1 | 10/2015 | Herigstad et al. |
| 2015/0332031 | A1 | 11/2015 | Mistry |
| 2015/0373408 | A1 | 12/2015 | Yurasits |
| 2016/0057457 | A1 | 2/2016 | Clements |
| 2016/0127786 | A1 | 5/2016 | Langer |
| 2016/0323643 | A1 | 11/2016 | Panchaksharaiah |
| 2018/0035166 | A1 | 2/2018 | Truong et al. |

OTHER PUBLICATIONS

"wearable, adj." Oxford Living Dictionaries. Oxford University Press, Mar. 2017. Web. Apr. 14, 2017. <https://en.oxforddictionaries.com/definition/us/wearable>, pp. 1-3.

"More things you'll love to do with Apple Watch", Apple, apple.com, Mar. 23, 2016, pp. 1-6.

"Oculus Gear VR", Samesung, samsung.com, Nov. 16, 2015, pp. 1-13.

"ZigBee Remote Control", ZigBee Alliance, zigbee.com, Dec. 3, 2014, pp. 1-7.

Barthold, Jim , "Nod Labs, Broadcom demonstrate wearable control of connected devices", Fierce Cable, fiercecable.com, Apr. 30, 2014, pp. 1-4.

Program Preferences

| Channel | Time | Program | Record | Present | |
|---|---|---|---|---|---|
| 282 | 11:00pm | Pacific Sharks | DVR | TV | Phone |
| 252 | 11:00pm | Major Crimes | DVR | TV | Phone |
| 261 | 11:00pm | The Warren Commission | DVR | TV | Phone |
| 274 | 11:00pm | Flip a House: Global Edition | DVR | TV | Phone |

APPARATUS AND METHOD FOR PROVIDING PROGRAMMING INFORMATION FOR MEDIA CONTENT TO A WEARABLE DEVICE

CROSS-REFERENCE TO RELATED APPLICATIONS

This application is a Continuation of U.S. patent application Ser. No. 15/221,014 filed on Jul. 27, 2016. The contents of the foregoing is hereby incorporated by reference into this application as if set for herein in full.

FIELD OF THE DISCLOSURE

The subject disclosure relates to apparatus and method for providing programming information for media content to a wearable device.

BACKGROUND

Wearable devices such as smartwatches and fitness bands have become popular as technology has developed low power sensors and low power wireless communication. This allows wearable devices to operate for longer periods of time with increased functionality. Further, user interfaces provide an improved user experience in operating mobile applications for wearable devices.

BRIEF DESCRIPTION OF THE DRAWINGS

Reference will now be made to the accompanying drawings, which are not necessarily drawn to scale, and wherein:

FIG. 3 depicts an illustrative embodiment of a user interface for providing programming information for media content to a wearable device;

DETAILED DESCRIPTION

Figure 1:
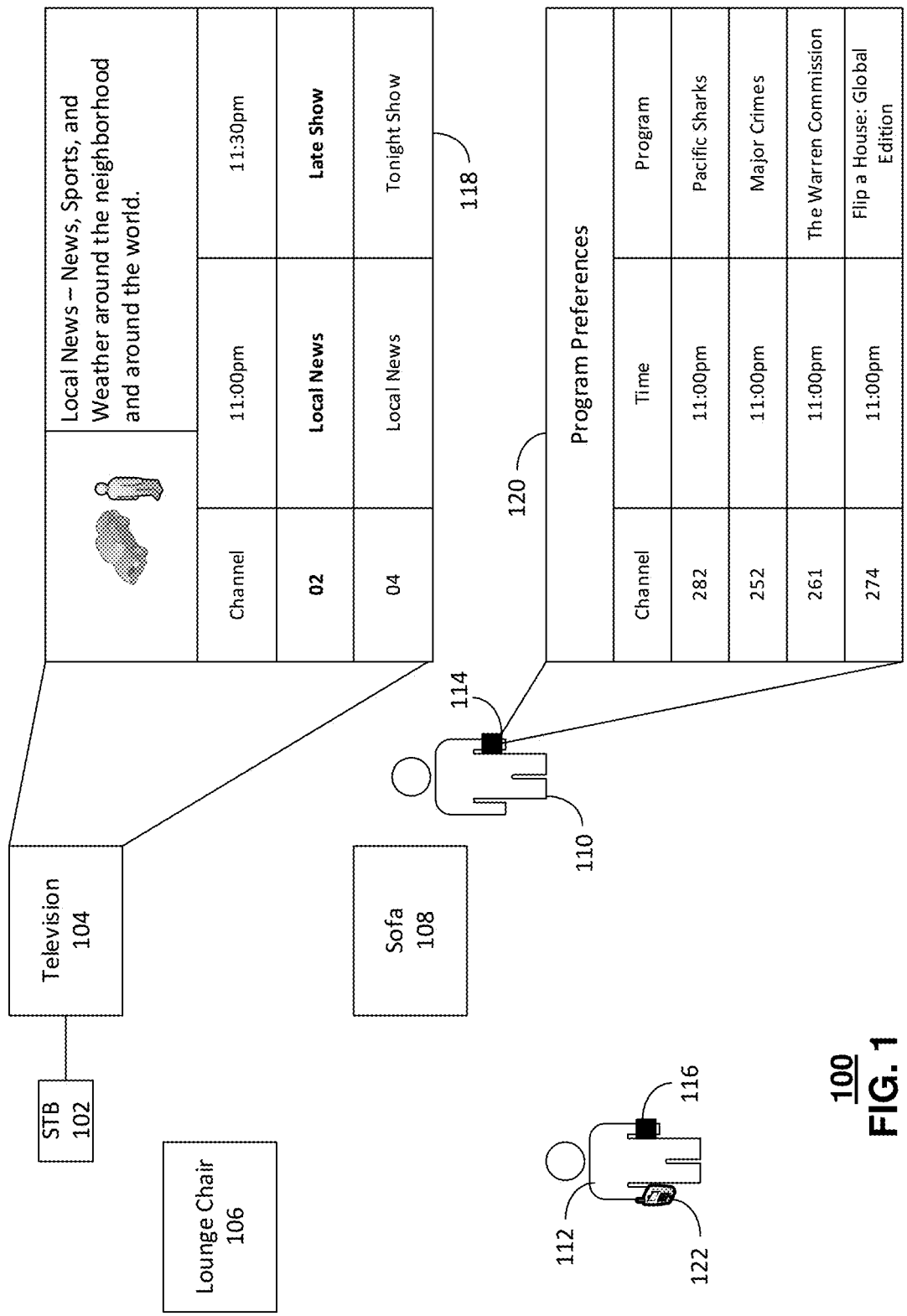
FIGS. 1-2 depicts illustrative embodiments of systems for providing programming information for media content to a wearable device.

The subject disclosure describes, among other things, illustrative embodiments for providing programming information for media content to a wearable device. One or more embodiments can include detecting a first wearable device and a second wearable device in proximity of a viewing device and identifying a first user profile associated with the first wearable device and a second user profile associated with the second wearable device. Further embodiments can include identifying a first set of media content preferences according to the first user profile and a second set of media content preferences according to the second user profile. Additional embodiments can include providing a first filtered electronic programming guide to the first wearable device and providing a second filtered electronic programming guide to the second wearable device. The first filtered electronic programming guide indicates the first set of media content preferences and the second filtered electronic programming guide indicates the second set of media content preferences. Other embodiments are described in the subject disclosure.

One or more aspects of the subject disclosure include a processor and a memory that stores executable instructions that, when executed by the processor, facilitate performance of operations. The operations can include detecting a first wearable device and a second wearable device in proximity of a viewing device. Further operations can include identifying a first user profile associated with the first wearable device and a second user profile associated with the second wearable device. Additional operations can include identifying a first set of media content preferences according to the first user profile and a second set of media content preferences according to the second user profile. Other operations can include providing a first filtered electronic programming guide to the first wearable device and providing a second filtered electronic programming guide to the second wearable device. The first filtered electronic programming guide indicates the first set of media content preferences and the second filtered electronic programming guide indicates the second set of media content preferences.

One or more aspects of the subject disclosure include a machine-readable storage medium, comprising executable instructions that, when executed by a processor of a wearable device, facilitate performance of operations. The operations can include providing location information of the wearable device to a media processor. Further, the media processor can detect the wearable device is in proximity of a display device based on the location information. In addition, the media processor identifies a user profile associated with the wearable device and the media processor identifies a set of media content preferences according to the user profile. The media processor generates a filtered electronic programming guide according the set of media content preferences. The operations can include receiving the filtered electronic programming guide indicating the set of media content preferences.

One or more aspects of the subject disclosure include a method for detecting, by a processing system including a processor, a first wearable device and a second wearable device in proximity of a viewing device. The method can further include receiving, by the processing system, from the first wearable device, first user-generated input comprising a first selected media content. In addition, the method can include receiving, by the processing system, from the second wearable device, second user-generated input comprising a second selected media content. Also, the method can include identifying by the processing system, a first priority according to a first user profile associated with the first wearable device and a second priority according to a second user profile associated with the second wearable device. Further, the method can include presenting, by the processing system, one of the first selected media content and the second selected media content on the viewing device according to a higher priority between the first priority and the second priority.

Figure 2:
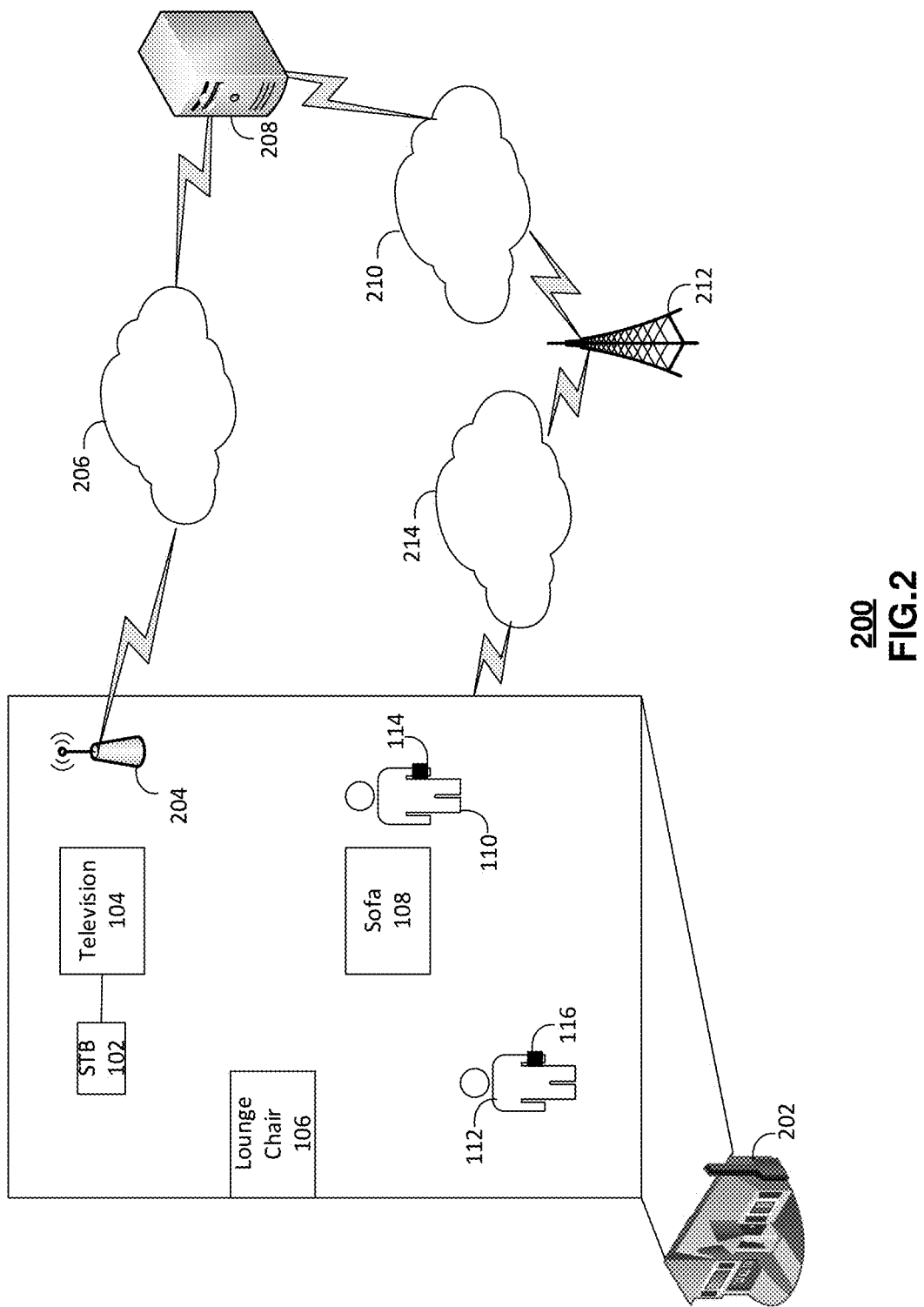

FIGS. 1-2 depicts illustrative embodiments of systems 100 and 200 for providing programming information for media content to a wearable device. Referring to FIG. 1, in one or more embodiments, a living room of a residential premises can include a media processor 102 such as set top box (STB). The set top box can be communicatively coupled to a television 104, mobile phone 122, or another communication device with a display. The viewing area of the television 104 can comprise an area in proximity to the television 104 including the seating area of the lounge chair 106 and sofa 108. Further, in some embodiments, an area beyond the seating area can also be considered in proximity to the television 104 and the viewing area.

In one or more embodiments, a user 110 accesses media content programming information to select media content to view or record for future playback from the set top box (or media processor) 102 via the television 104. Media content programming can be displayed on a user interface, such as an electronic programming guide (EPG) 118, presented on the television 104. Further, in one corner of the electronic programming guide 118 can include currently viewed media content program in a picture in picture display. In addition, the electronic programming guide 118 can include a list of media content programs arranged by broadcast channel and time. The user 110 can select to access information of a particular media content program in the electronic programming guide 118 using a remote control. The user 110 can highlight a line item of the list of media content programs. Information regarding the highlighted media content program can be listed in another corner of the electronic programming guide 118.

In one or more embodiments, a media content provider, such as but not limited to, an Internet service provider, cable television service provider, and satellite television provider operates the set top box 102. Further, the media content provider can configure the set top box 102, or a computer server communicatively coupled to the set top box 102, to notify users 110 and 112 of upcoming media content programs according to the users 110 and 112 media content preferences. If the television 104 is operating, the set top box can display a notification of the upcoming media programs on the television in the electronic programming guide 118. However, user 110 and 112 can be walking around the premises or busy with tasks such that the users 110 and 112 are not viewing the television to be aware of a notification on the electronic programming guide. Further, the television 104 may not be operating if the users are walking around the premises or busy with tasks. In addition, a mobile phone 122 of a user 112 may not be accessible such that the users may not view any notifications of upcoming media content programs sent to mobile phone 122.

In one or more embodiments, the set top box 102 detects a wearable device 114 for a user 110 and another wearable device 116 for another user 112. A wearable device can be various types of devices that are wearable by a user, such as a "smart" watch, band, or any other wearable computing device including devices that are coupled to clothing or an accessory. Such wearable devices 114 and 116 can be communicatively coupled to global positions systems (GPS) or other location sensors that provide the location information for the wearable devices 114 and 116 to computer servers across communication networks. The set top box 102 can identify the locations of the wearable devices 114 and 116 by retrieving the location information from such a computer server. In other embodiments, the wearable devices 114 and 116 and the set top box 102 can be equipped with peer to peer communication technology that allow the wearable devices 114 and 116 to communicate their location directly to the set top box 102 or via a premises communication network such as a WiFi network.

In or more embodiments, prior to detection of the wearable devices 114 and 116, the users 110 and 112 can register the wearable devices 114 and 116 with the media content provider. The users 110 and 112 can access a web site through a web portal or a computer application using a computer, mobile phone, or the wearable device 114 and 116. Further, as part of registering the wearable device 114 and 116, a user profile is associated with the wearable device. The user profile can comprise identification of the user and account information for the media content provider. In addition, identification information for the wearable device 114 and 116 can be associated with the user profiles for the users 110 and 112. Further, past viewing choices of media content are associated with the user profile. The set top box 102 or a computer server communicatively coupled to the set top box 102 can identify media content preferences for a user based on the past viewing choices. The media content preferences are associated with the user profile. Media content preferences can be upcoming episodes of media content programs that a user 110 and 112 has viewed in the past. Also, the media content preferences can be upcoming media content programs that the user 110 and 112 have not viewed in the past but are related to their past viewing choices.

In addition, a user priority is associated with the user profile. That is, more than one user 110 and 112 can be associated with a premises and a set top box 102. If more than one user requests to view different media content programs on the television 104 from their respective wearable devices 114 and 116, mobile phone 122, or any other communication device during a time interval, then the set top box can access the user profile of each user 110 and 112 to determine their respective user priority. The media content program associated with a user 112 with a higher priority is presented on the television 104. For example, a user 110 can be a child and another user 112 can be for a parent. The child and parent request from the set top box 102 different media content programs to view on the television 104 but set top box has accessed each user profile and determines that the parent has a higher priority. Thus, the set top box 102 presents the media content program requested by the parent on the television. However, the media content selected by the user 110 with the lower priority can be recorded to a digital video recorder (automatically or based on user-generated input) for later playback.

In one or more embodiments, detection of the wearable device can include detecting whether the wearable device 114 is worn by the user 110 or simply resting on a surface (e.g. coffee table) near the set top box 102 or television 104. In some embodiments, the set top box 102 detects small motion or movement of the wearable device 114 which can indicate that the user 110 is wearing the wearable device 114. That is, the set top box 102 can be provided location information of the wearable device 114 over a time interval and determine small movements of wearable device 114 indicating the wearable device is not resting on a surface. However, the set top box 102 can also determine by such location information of the wearable device 114 that the wearable device 114 is not in motion (e.g. user 110 wearing wearable device 114 is not walking across the room but is standing or sitting near the sofa 108) and is relatively stationary as it is not moved beyond a certain, relatively small radial or linear distance over the time interval. In other embodiments, the wearable device 114 can be a smart watch or band that detects a pulse (i.e. heartbeat) from the wrist of the user 110. In response to detecting the pulse of user 110, the wearable device 114 sends a signal to the set top box 102 that indicates that the wearable device 114 is being worn by the user 110. In further embodiments, the wearable device 114 detects that it is in motion and indicates to the set top box 102 that the wearable device is being worn. In additional embodiments, the user 110 can provide input to the wearable device 114 indicating that the wearable device is being worn. The wearable device 114 can then send a signal to the set top box 102 that the wearable device is being worn by the user 110, accordingly. In some embodiments, the set top box 102 is communicative coupled to a camera that can capture an image of the viewing area of the television 104. Using image processing techniques on the captured image of the viewing area, the set top box (or a computer server communicatively coupled to the set top box 102) can determine whether the wearable device 114 is being worn by the user 110 or is resting on a surface.

In one or more embodiments, responsive to detecting wearable devices 114 and 116, the set top box 102 identifies the user profile for each wearable device 114 and 116. Further, the set top box 102 identifies the media content preferences associated with each user profile. The set top box 102 or a computer server provides, via the set top box 102 a filtered electronic programming guide 120 to the detected wearable devices 114 and 116. In some embodiments, the set top box 102 or the computer server determines whether wearable devices 114 and 116 are being worn by the users 110 and 112. If the set top box 102 or the computer server determines that the wearable devices 114 and 116 are not being worn, then the set top box 102 or computer server may not transmit a filtered electronic programming guide to an unworn wearable device 114 and 116. Each wearable device 114 and 116 can be provided a different filtered electronic programming guide 120 according to the media content preferences associated with the user profile of the wearable device 114 and 116. In some embodiments, the filtered electronic programming guide 120 does not have as much information as the electronic programming guide 118 that is displayed on the television 104. This can be due to the presentation and input capabilities of the wearable device 114 and 116. That is, the wearable devices 114 and 116 may have small displays and/or low resolution capability such that the displaying all the information in an electronic programming guide 118 would not be comprehensible to the users 110 and 112. Further, the wearable devices 114 and 116 may have only a few operation buttons and a small display with limited touchscreen capability. The filtered electronic programming guide 120 can list the upcoming media content programs based on the user's 110 media content preferences according the broadcast channel time, and title. The user can use operation buttons or touchscreen capability to provide user-generated input to select viewing or storing of any of the upcoming media content programs listed on the filtered electronic programming guide.

In one or more embodiments, the set top box 102, or the computer server communicatively coupled to the set top box 102, can detect whether the wearable devices 114 and 116 are stationary or in motion. The set top box 102 or the computer server can access the location information of each wearable device 114 and 116 over a time interval to determine whether the wearable devices 114 and 116 are in stationary or in motion. In some embodiments, the set top box 102 or computer server can determine whether the wearable devices 114 and 116 are located within the viewing area of the television 104. In further embodiments, the set top box 102 or the computer server can be configured with the location of the television 104 to determine the viewing area. In other embodiments, a camera can be communicatively coupled to the set top box 102. The set top 102 can capture an image of the viewing area and the set top box 102 or the computer server can use image processing techniques to determine whether the users 110 and 112 are within the viewing area. The image processing techniques can determine a person is within the viewing area and/or determine the wearable device is within the viewing area. Responsive to determining whether the wearable device 114 is stationary or within the viewing area, a filtered electronic programming guide with a list of upcoming media content programs is sent to the wearable device 114 that is stationary and/or within the viewing area.

In one or more embodiments, a filtered electronic programming guide 120 with a list of upcoming media content programs can also be sent to a wearable device 116 in motion or outside the viewing area (e.g. within a predetermined distance threshold from the viewing area). This allows for the user 112 to stop and/or come to the viewing area and select to view one of the upcoming media content programs. In some embodiments, the user 112 with the wearable device 116 in motion can select to record one of the upcoming media content programs to a digital video recorder for later playback.

In one or more embodiments, the set top box 102 or a computer server coupled to the set top box 102, can identify a common set of media content preferences among the media content preferences associated with the users 110 and 112. The filtered electronic programming guide 120 can highlight, or otherwise indicate, the media content preferences that are in common with other users. This can allow a user to select a media content program to view that is common with other users in the viewing area.

In one or more embodiments, a user 110 can select an upcoming media content program from the filtered electronic programming guide 120 to present on the television 104. In further embodiments, some of the media content preferences are for media content programs that are carried on broadcast channels that are not currently subscriber by the user 110. For example, the media preferences include a science fiction media content programs carried on an unsubscribed broadcast channel based on the user's past viewing choices of viewing other science fiction media content programs. Upon selecting the media content program carried on a currently subscribed broadcast channel, the set top box can cause the user to subscribe to the broadcast channel Thus, the user subscribes to a new media content programming service.

Referring to FIG. 2, in one or more embodiments, set top box 102 or computer server 208 can detect wearable devices 114 and 116 associated with users 110 and 112. Further, set top box 102 or computer server 208 can provide the wearable devices 114 and 116 with a filtered electronic programming guide 120 including media content preferences associated with users 110 and 112. In some embodiments, the set top box 102 can provide the filtered electronic programming guide 120 to the wearable devices 114 and 116 using peer to peer wireless communication. In further embodiments, the set top box can use a premise communication network, such as a WiFi network, to provide the filtered electronic programming guide 120. In other embodiments, the set top box 102 or the computer server 208 can provide the wearable devices 114 and 116 with the filtered electronic programming guide 120, including media content preferences associated with users 110 and 112, over communication networks 210 and 214 via base station 212. That is, communication network 206 communicatively couples the computer server 208 to the set top box 102 via access point 204. Further, communication network 210 communicatively couples computer server 208 with base station 212. The communication network 219 can be a combination of landline and wireless networks. Base station 212 is communicative coupled to the wearable devices 114 and 116 over communication network 214. Communication network 214 can include a cellular and mobile telephone network.

In one or more embodiments, prior to providing a filtered electronic programming guide 120 to the wearable devices 114 and 116, the set top box 102 can detect the wearable devices 114 and 116 using peer to peer technology or a premises communication network such as a WiFi network. In some embodiments, the set top box 102 can be provided location information of the wearable devices by computer server 208. Further, the computer server 208 can periodically poll the location of wearable devices 114 and 116 from a location service provider (e.g. GPS service provider). The computer server 208 can provide the location information to the set top box 102 to determine whether the wearable devices 114 and 116 are within the viewing area of the television 104, stationary, or in motion. In other embodiments, the computer server 208 can determine whether the wearable devices 114 and 116 are within the viewing area of the television 104, stationary, or in motion.

In one or more embodiments, responsive to detecting the wearable devices 114 and 116, the set top box 102 or computer server 208 can identify the user profiles associated with the wearable devices 114 and 116. Further, the set top box 102 or computer server 208 can identify the media preferences associated with the user profiles. In addition, the set top box 102 or computer server 208 can provide the filtered electronic programming guide with an indication of the media content preferences for each user 110 and 112. Media content preferences are based on the past viewing choices of media content programs by the user. That is, the set top box 102 stores or send to the computer server 208 to store the past viewing choices of a user 110 and 112. The set top box 102 or computer server 208 can analyze the past viewing choices as well as upcoming media content programs. The results of the analysis can include a list of upcoming episodes of media content programs that a user 110 and 112 has viewed in the past. Further, the results of the analysis can include upcoming media content programs that the user 110 and 112 have not viewed in the past but are related to their past viewing choices. Thus, the media content preferences of the user includes upcoming episodes of media content programs that a user 110 and 112 has viewed in the past as well as upcoming media content programs related to past viewing choices.

FIG. 3 depicts an illustrative embodiment of a filtered electronic programming guide 300 for providing programming information for media content to a wearable device. In one or more embodiments, the filtered electronic programming guide 300 includes a list of media content preferences for a user of the wearable device. The broadcast channel, time and title of the media content program are listed in the filtered electronic programming guide 300. Further, the filtered electronic programming guide 300 can indicate common media content preferences between the user of the wearable device and the user of another wearable device that was detected by the set top box 102 during the same time interval. For example, common preferences can be highlighted, have bold text, or otherwise indicate common media content preferences. Line items for channel 282 and 261 in filtered electronic programming guide 300 indicate common media content preferences.

In one or more embodiments, the filtered electronic programming guide 300 can be presented on a display of a wearable device 114 and 116 having limited touchscreen input capability as well as operation buttons. In some embodiments, the input capability of the wearable device can be voice activation responsive to voice commands. If so, the user 110 and 112 can provide user-generated input (e.g. touch screen, operation buttons, voice commands, etc.) to indicate whether to present a media content program from the media content preferences to the viewing device of the television 104. However, if the user 110 and 112 is in motion or not within the viewing area of the television 104 (or for any other reason), the user can indicate using user-generated input to provide the media content program to a mobile phone 122 or other portable media device (e.g. laptop computer, tablet computer, etc.) or record the media content program to a digital video recorder (DVR) for later playback. Note, the set top box 102 and computer server 208 can provide the filtered electronic programming guide 300 not only when the wearable devices 114 and 116 are in proximity to set top box 102 but also when the wearable devices 114 and 116 are remote from, or not within the premises of, set top box 102.

Figure 4:
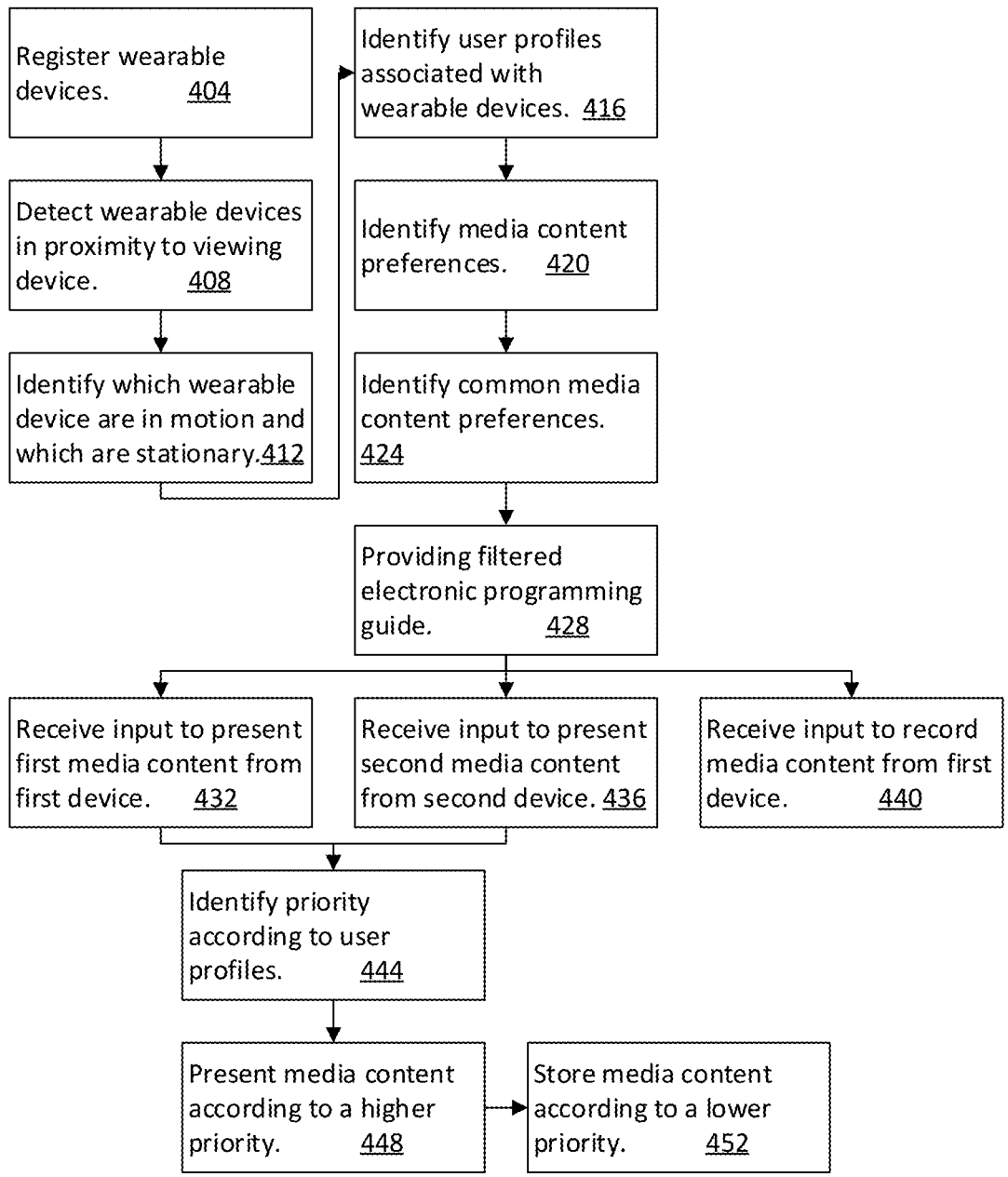
FIG. 4 depicts an illustrative embodiment of a method used in portions of the systems described in FIGS. 1-2.

FIG. 4 depicts an illustrative embodiment of a method 400 used for providing programming information for media content to a wearable device. At step 404, users 110 and 112 can register the wearable devices 114 and 116 with a computer server 208 operated by the media content provider. The users 110 and 112 can access a web site through a web portal or operate any other computer application using a computer, mobile phone, or the wearable device 114 and 116. Further, as part of registering the wearable device 114 and 116, a user profile is associated with the wearable device. The user profile can comprise or be associated with identification of the user and account information for the media content provider. In addition, the identification information of the wearable device can be associated with the user profile. Further, past viewing choices of media content are associated with the user profile.

At step 408, the set top box 102 or computer server 208 detecting a first wearable device and a second wearable device in proximity of a viewing device. The set top box 102 can detect the wearable devices 114 and 116 using peer to peer technology or a premises communication network such as a WiFi network. In some embodiments, the set top box 102 can be provided location information of the wearable devices by computer server 208. Further, the computer server 208 can periodically poll the location of wearable devices 114 and 116 from a location service provider (e.g. GPS service provider). The computer server 208 can provide the location information to the set top box 102 to determine whether the wearable devices 114 and 116 are within the viewing area of the television 104.

At step 412, identifying which of the wearable devices 114 and 116 are stationary and which of the wearable device 114 and 116 are in motion. The set top box 102 or computer server 208 can use the location information over a time interval to determine which wearable devices 114 and 116 are stationary or in motion.

At step 416, the set top box 102 or computer server 208 identify a user profile associate with the wearable devices 114 and 116. The set top box 102 or computer device 208 determines identification information for wearable devices 114 and 166 upon detection. Further, the set top box 102 and computer server 208 accesses the stored user profile associated the wearable device based on the identification information of the wearable devices 114 and 116. Such identification information for the wearable devices 114 and 116 are associated with the user profiles during registration.

At step 420, the set top box 102 or computer server 208 identify the media content preferences for the users 110 and 112 according to user profiles of the users 110 and 112. Further, at step 424, the set top box 102 or computer server 208 identify the media content preferences that are in common among the media content preferences associated with the different user profiles.

At step 428, the set top box 102 or computer server 208 provide filtered programming guides 120 and 300 to the wearable devices 114 and 116. The filtered electronic programming guides 120 and 300 include the media content preferences for upcoming media content programs including the common media content preferences. At step 432, the set top box 102 or computer server 208 receives user generated input to present selected media content from the media content preferences on the viewing device of the television 104 from a wearable device 114. In addition, at step 436, the set top box 102 or computer server 208 receives other user generated input to present other selected media content from the media content preferences on the viewing device of the television 104 from another wearable device 116. Also, at step 444, the set top box 102 or computer server 208 identify a priority according to one user profile associated with one wearable device and another priority according to another user profile associated with another wearable device. Moreover, at step 448, the set top box 102 or computer server 208 present the selected media content from the user with a higher priority between the two priorities associated with the two user profiles, accordingly.

At step 452, the set top box or computer server 208 stores, to a digital video recorder, the selected media content with a lower priority between the two priorities associated with the two wearable devices. Further, at step 440, the set top box 102 or computer server 208 receives user generated input to record to a digital video recorder one of the listed media content on the filtered electronic programming guide.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
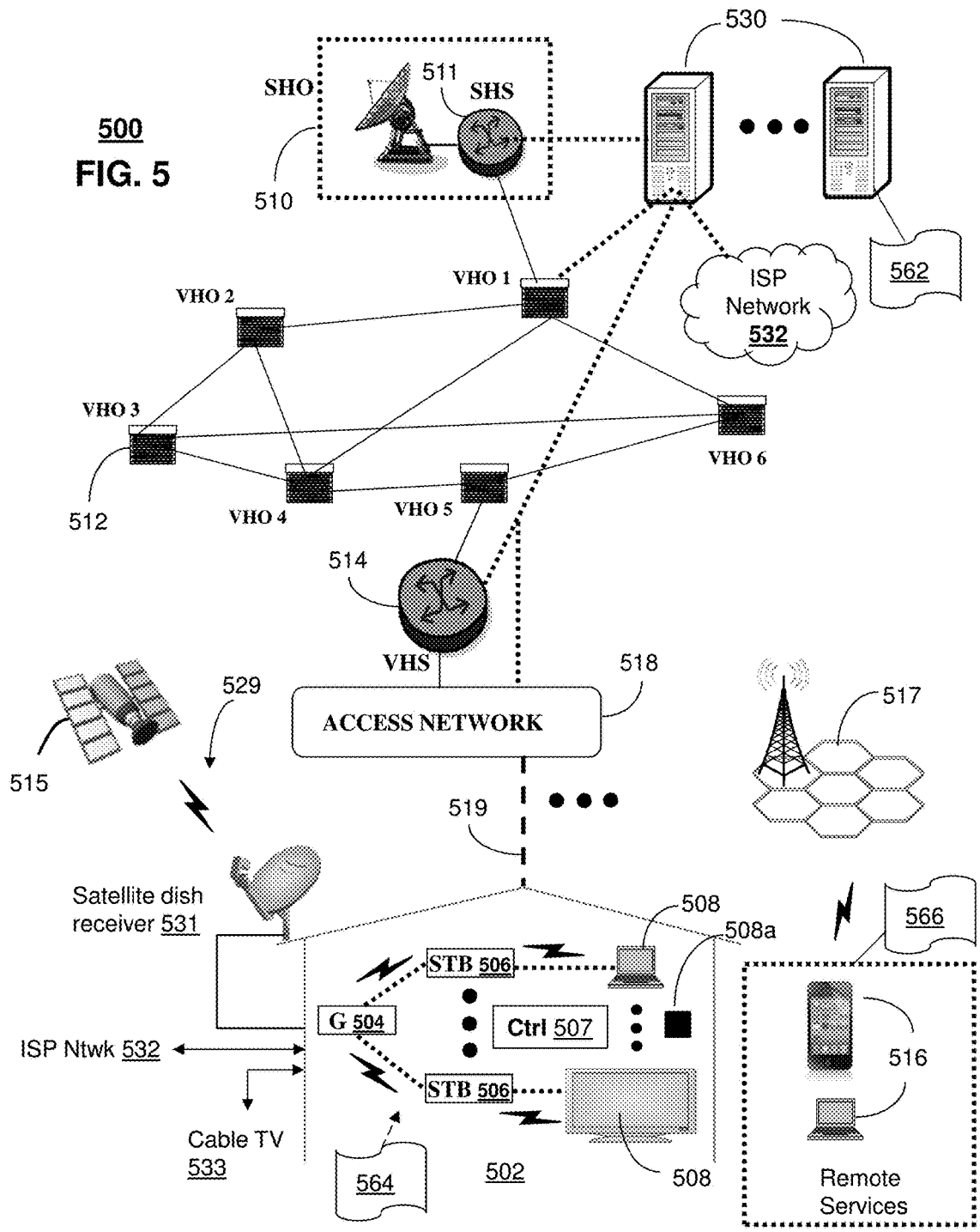
FIG. 5 depicts an illustrative embodiment of a communication system that provide programming information for media content to a wearable device.

FIG. 5 depicts an illustrative embodiment of a first communication system 500 for delivering media content. The communication system 500 can represent an Internet Protocol Television (IPTV) media system. Communication system 500 can be overlaid or operably coupled with refer to systems 100 and 200 of FIGS. 1 and/or 2 as another representative embodiment of communication system 500. For instance, one or more devices illustrated in the communication system 500 of FIG. 5 can provide programming information for media content to one or more wearable devices. In one or more embodiments, a set top box 506 or computer server 530 can detect wearable devices 508a in proximity of a viewing device 508 and 516. The set top box 506 or computer server 530 can identify user profiles associated with a wearable device. Further, set top box 506 or computer server 530 can identify media content preferences according to the user profile. In addition, the set top box 506 or computer server 530 can provide a filtered electronic programming guide to the wearable device 508a. The filtered electronic programming guide indicates the media content preferences.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a media content management server 530. The media content management server 530 can use computing and communication technology to perform function 562, which can include among other things, providing programming information for media content to a wearable device in accordance with the techniques described by method 400 of FIG. 4. For instance, function 562 of media content management server 530 can be similar to the functions described for set top box 102 and computer server 208 of FIGS. 1-2. The media processors 506 and wireless communication devices 516 can be provisioned with software functions 564 and 566, respectively, to utilize the programming information services of media content management server 530. For instance, functions 564 and 566 of media processors 506 and wireless communication devices 516 and 508a can be similar to the functions described for the communication devices 114, 116, and 122 of FIGS. 1-2 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
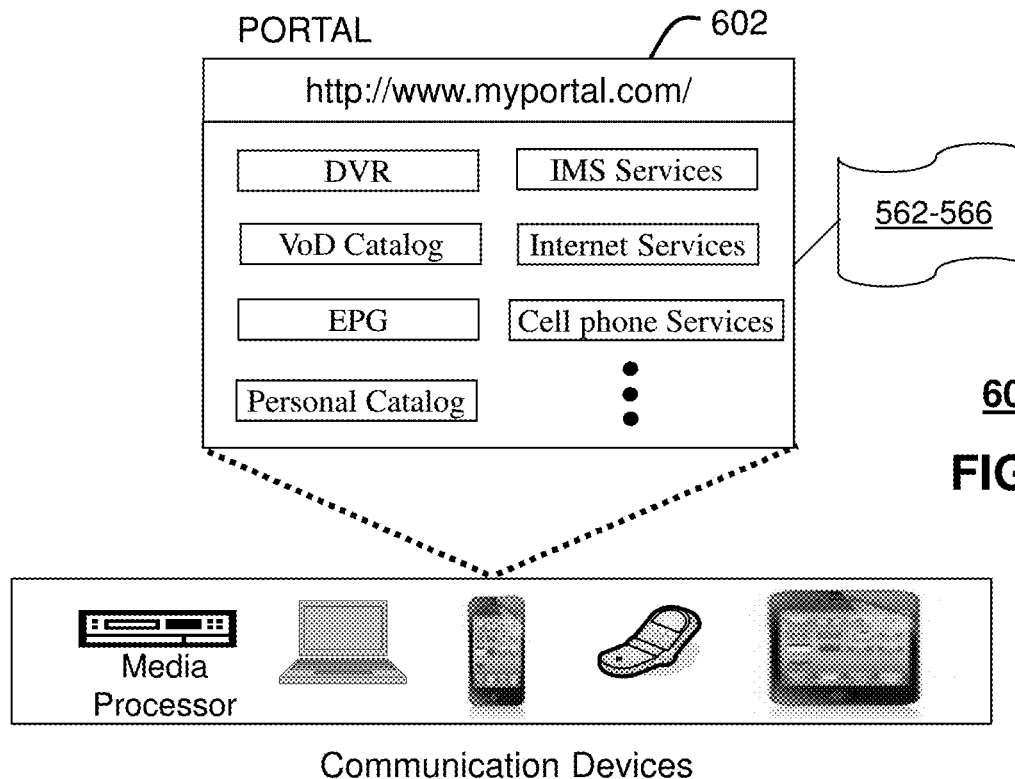
FIG. 6 depicts an illustrative embodiment of a web portal for interacting with the communication systems of providing programming information for media content to a wearable device.

FIG. 6 depicts an illustrative embodiment of a web portal 602 of a communication system 600. Communication system 600 can be overlaid or operably coupled with systems 100 and 200 of FIGS. 1 and 2, communication system 500 as another representative embodiment of systems 100 and 200 of FIGS. 1 and 2, and communication system 500. The web portal 602 can be used for managing services of systems 100 and 200 of FIGS. 1 and/2 and communication system 500. A web page of the web portal 602 can be accessed by a Uniform Resource Locator (URL) with an Internet browser using an Internet-capable communication device such as those described in FIGS. 1-2 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-566 to adapt these applications as may be desired by subscribers and/or service providers of systems 100 and 200 of FIGS. 1 and 2, and communication system 500. For instance, users of the services provided by server 208 or server 530 can log into their on-line accounts and register with the server 530 the wearable devices 114 and 116. The users 110 and 112 can access a web site through a web portal 602 or any other computer application using a computer, mobile phone, or the wearable device 114 and 116. Further, as part of registering the wearable device 114 and 116, a user profile is associated with the wearable device. The user profile can comprise identification of the user and account information for the media content provider. Further, past viewing choices of media content are associated with the user profile. Identification information for the wearable devices 114 and 116 are associated with the user profiles during registration. Service providers can log onto an administrator account to provision, monitor and/or maintain the systems 100 and 200 of FIGS. 1 and 2 or server 530.

Figure 7:
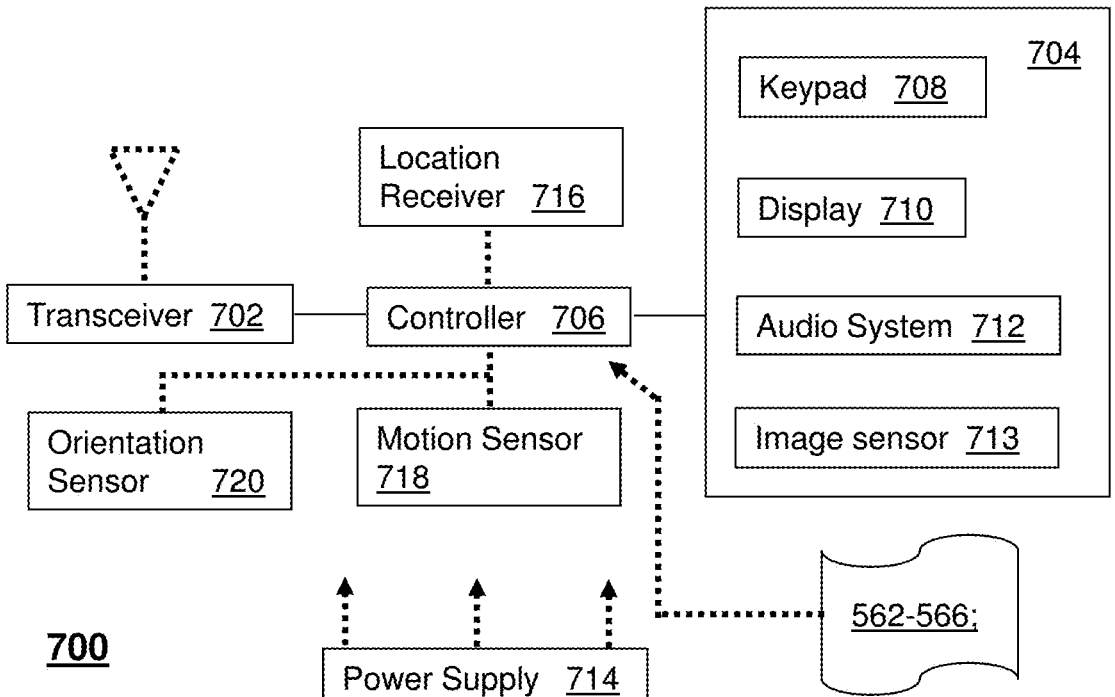
FIG. 7 depicts an illustrative embodiment of a communication device used in systems for providing programming information for media content to a wearable device.

FIG. 7 depicts an illustrative embodiment of a communication device 700. Communication device 700 can serve in whole or in part as an illustrative embodiment of the devices depicted in FIGS. 1 and 2, and FIG. 5 and can be configured to perform portions of method 400 of FIG. 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of wearable device 114 and 166, mobile phone 122, the media processor 506, the media devices 508, wearable device 508a, or the portable communication devices 516 of FIG. 5. It will be appreciated that the communication device 700 can also represent other devices that can operate in systems 100 and 200 of FIGS. 1 and 2, communication system 500 of FIG. 6 such as a gaming console and a media player. In addition, the controller 706 can be adapted in various embodiments to perform the functions 562-566.

Upon reviewing the aforementioned embodiments, it would be evident to an artisan with ordinary skill in the art that said embodiments can be modified, reduced, or enhanced without departing from the scope of the claims described below. For example, a person of ordinary skill in the art would understand that portions of some embodiments can be combined with portions of other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
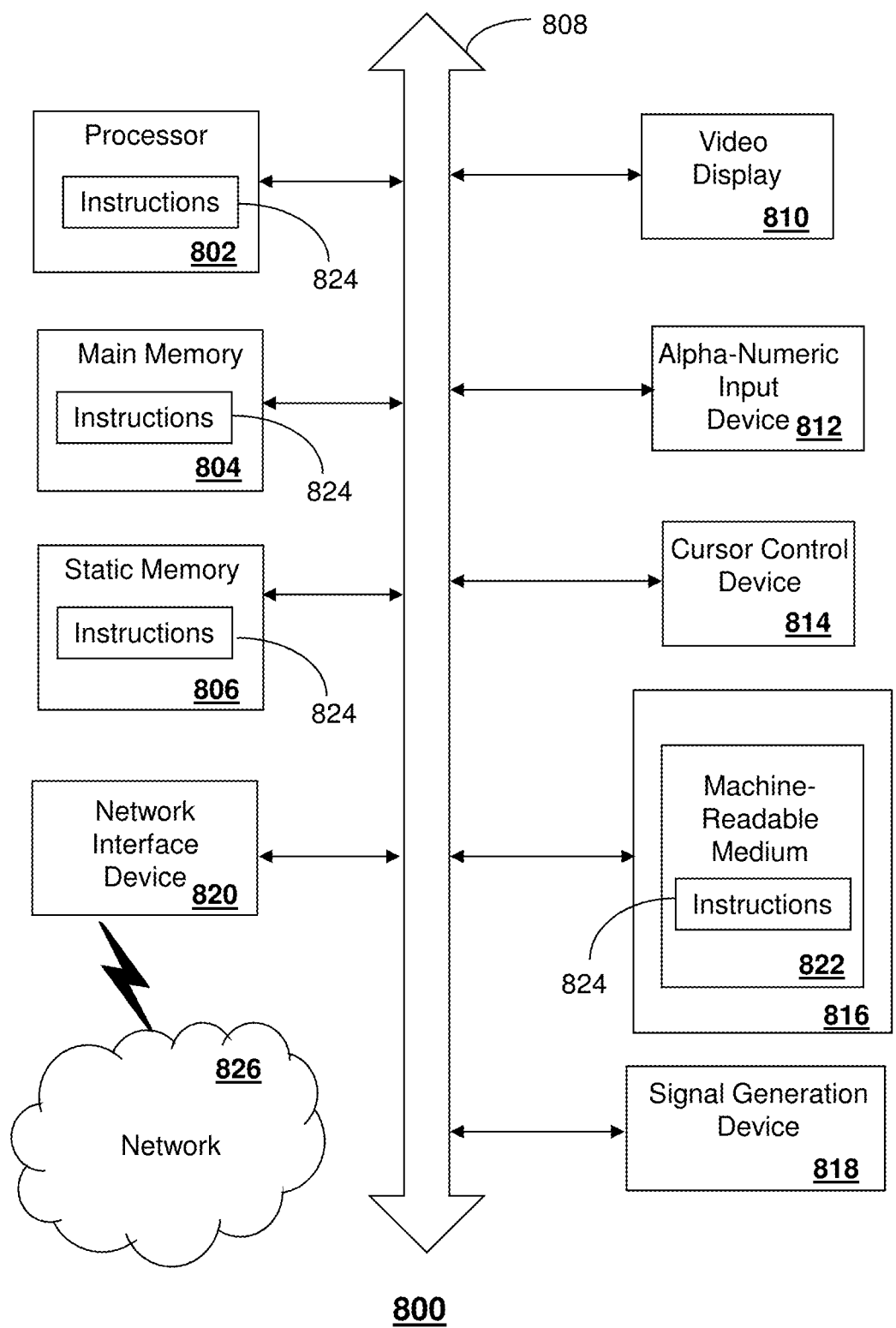
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the set top box 102, media content management server 530, the media processor 506, wearable devices 114, 116, 508a mobile phone 122, media devices 508, and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a processor; and
    a memory that stores executable instructions that, when executed by the processor, facilitate performance of operations, comprising:
        detecting a first smart watch and a second smart watch in proximity of a display device, wherein each of the first smart watch and the second smart watch is configured to wrap around a wrist of a person;
        receiving a first user input from the first smart watch indicating to present a first selected media content and receiving a second user input from the second smart watch indicating to present a second selected media content;
        causing a presentation of the first selected media content at the display device and storing of the second selected media content in a digital video recorder in response to a determination of a first user profile having a higher priority than a second user profile, wherein the first user profile is associated with the first smart watch and the second user profile is associated with the second smart watch;
        detecting the first smart watch is in motion; and
        causing a presentation of the second selected media content at the display device and storing at least a portion of the first selected media content in the digital video recorder in response to detecting that the first smart watch is in motion and the second smart watch is stationary.

2. The device of claim 1, wherein the operations comprise identifying the first user profile associated with the first smart watch and the second user profile associated with the second smart watch.

3. The device of claim 2, wherein the operations comprise identifying a first set of media content preferences according to the first user profile and a second set of media content preferences according to the second user profile.

4. The device of claim 1, wherein the operations comprise generating a first filtered electronic programming guide to be presented on the first smart watch and generating a second filtered electronic programming guide to be presented on the second smart watch.

5. The device of claim 1, wherein the operations comprise providing a first filtered electronic programming guide to the first smart watch and providing a second filtered electronic programming guide to the second smart watch.

6. The device of claim 1, wherein the operations comprise transmitting a request to first smart watch in motion for recording media content.

7. The device of claim 1, wherein the operations further comprise:
    identifying a common set of media content preferences between a first set of media content preferences and a second set of media content preferences; and
    providing a first filtered electronic programming guide and a second filtered electronic programming guide, wherein providing the first filtered electronic programming guide and the second filtered electronic programming guide further comprises indicating the common set of media content preferences.

8. The device of claim 7, wherein operations comprise providing the second selected media content, wherein the providing of the second selected media content further comprises subscribing to a new media content programming service.

9. A machine-readable storage medium, comprising executable instructions that, when executed by a processing system including a processor, facilitate performance of operations, comprising:
- detecting a first smart watch and a second smart watch in proximity of a display device, wherein each of the first smart watch and the second smart watch is configured to wrap around a wrist of a person;
- identifying a first user profile associated with the first smart watch and a second user profile associated with the second smart watch; receiving a first user input from the first smart watch indicating to present a first selected media content and receiving a second user input from the second smart watch indicating to present a second selected media content;
- causing a presentation of the first selected media content at the display device and storing of the second selected media content in a digital video recorder in response to a determination of the first user profile having a higher priority than the second user profile, wherein the first user profile is associated with the first smart watch and the second user profile is associated with the second smart watch;
- detecting the first smart watch is in motion; and
- causing a presentation of a second action that causes presenting the second selected media content at the display device and storing the first selected media content in the digital video recorder in response to detecting that the first smart watch is in motion and the second smart watch is stationary.

10. The machine-readable storage medium of claim 9, wherein the operations comprise identifying a first set of media content preferences according to the first user profile and a second set of media content preferences according to the second user profile.

11. The machine-readable storage medium of claim 9, wherein the operations comprise generating a first filtered electronic programming guide to be presented on the first smart watch and generating a second filtered electronic programming guide to be presented on the second smart watch.

12. The machine-readable storage medium of claim 9, wherein the operations comprise providing a first filtered electronic programming guide to the first smart watch and providing a second filtered electronic programming guide to the second smart watch.

13. The machine-readable storage medium of claim 9, transmitting a request to first smart watch in motion for recording media content.

14. The machine-readable storage medium of claim 9, wherein the operations further comprise:
- identifying a common set of media content preferences between a first set of media content preferences and a second set of media content preferences; and
- providing a first filtered electronic programming guide and a second filtered electronic programming guide, wherein providing the first filtered electronic programming guide and the second filtered electronic programming guide further comprises indicating the common set of media content preferences.

15. The machine-readable storage medium of claim 14, wherein the operations further comprise providing the second selected media content, wherein the providing of the second selected media content further comprises subscribing to a new media content programming service.

16. A method, comprising:
- detecting, by a processing system including a processor, a first smart watch and a second smart watch in proximity of a display device, wherein each of the first smart watch and the second smart watch is configured to wrap around a wrist of a person;
- generating, by the processing system, a first filtered electronic programming guide to be presented on the first smart watch and generating a second filtered electronic programming guide to be presented on the second smart watch; receiving, by the processing system, a first user input from the first smart watch indicating to present a first selected media content and receiving a second user input from the second smart watch indicating to present a second selected media content;
- causing, by the processing system, a presentation of the first selected media content at the display device and storing of the second selected media content in a digital video recorder in response to a determination of a first user profile having a higher priority than a second user profile, wherein the first user profile is associated with the first smart watch and the second user profile is associated with the second smart watch;
- detecting, by the processing system, the first smart watch is in motion; and
- causing, by the processing system, a presentation of a second action that causes presenting the second selected media content at the display device and storing the first selected media content in the digital video recorder in response to detecting that the first smart watch is in motion and the second smart watch is stationary.

17. The method of claim 16, comprising providing, by the processing system, the first filtered electronic programming guide to the first smart watch and providing, by the processing system, the second filtered electronic programming guide to the second smart watch.

18. The method of claim 17, comprising transmitting, by the processing system, a request to first smart watch in motion for recording media content.

19. The method of claim 17, comprising:
- identifying, by the processing system, a common set of media content preferences between a first set of media content preferences and a second set of media content preferences; and
- providing, by the processing system, the first filtered electronic programming guide and the second filtered electronic programming guide, wherein providing the first filtered electronic programming guide and the second filtered electronic programming guide further comprises indicating the common set of media content preferences.

20. The method of claim 17, comprising providing the second selected media content, wherein the providing of the second selected media content further comprises subscribing to a new media content programming service.

* * * * *

UNITED STATES PATENT AND TRADEMARK OFFICE
CERTIFICATE OF CORRECTION

PATENT NO. : 10,433,011 B2  
APPLICATION NO. : 15/879147  
DATED : October 1, 2019  
INVENTOR(S) : Heather Truong et al.

Page 1 of 1

It is certified that error appears in the above-identified patent and that said Letters Patent is hereby corrected as shown below:

On the Title Page

Please delete:
"(73) Assignee: The DIRECTIV Group, Inc., El Segundo, CA (US)"
And insert:
--(73) Assignee: The DIRECTV Group, Inc., El Segundo, CA (US)--

Signed and Sealed this
Fifth Day of May, 2020

Andrei Iancu
*Director of the United States Patent and Trademark Office*